(12) United States Patent
Kellner

(10) Patent No.: US 10,928,890 B2
(45) Date of Patent: Feb. 23, 2021

(54) USING CAMERA IMAGE LIGHT INTENSITY TO CONTROL SYSTEM STATE

(71) Applicant: Autodesk, Inc., San Rafael, CA (US)

(72) Inventor: Hans David Kellner, Oakland, CA (US)

(73) Assignee: AUTODESK, INC., San Rafael, CA (US)

(*) Notice: Subject to any disclaimer, the term of this patent is extended or adjusted under 35 U.S.C. 154(b) by 12 days.

(21) Appl. No.: 16/427,841

(22) Filed: May 31, 2019

(65) Prior Publication Data
US 2019/0354166 A1  Nov. 21, 2019

Related U.S. Application Data

(62) Division of application No. 15/192,745, filed on Jun. 24, 2016, now abandoned.
(Continued)

(51) Int. Cl.
| | |
|---|---|
| *G06F 3/01* | (2006.01) |
| *G09G 5/00* | (2006.01) |
| *G06F 3/03* | (2006.01) |
| *G06F 1/16* | (2006.01) |
| *H04N 13/339* | (2018.01) |
| *H04N 13/344* | (2018.01) |
| *G09G 3/00* | (2006.01) |

(52) U.S. Cl.
CPC .............. *G06F 3/011* (2013.01); *G06F 1/163* (2013.01); *G06F 1/1686* (2013.01); *G06F 3/017* (2013.01); *G06F 3/0304* (2013.01); *G09G 5/00* (2013.01); *H04N 13/339* (2018.05); *H04N 13/344* (2018.05); *G09G 3/003* (2013.01)

(58) Field of Classification Search
CPC ... G06F 3/011–017; G06F 3/042–0428; G06F 3/0485–04855; G06F 3/04815; G09G 3/001; G09G 3/003; H04N 13/332–344; H04N 5/23293–232941; G06T 19/003
See application file for complete search history.

(56) References Cited

U.S. PATENT DOCUMENTS

| 9,804,393 B1 | 10/2017 | Coz et al. |
| 2009/0249206 A1 | 10/2009 | Stahlberg |
| | (Continued) | |

OTHER PUBLICATIONS

DODOcase Cardboard Pop-up Viewer, DODOcase, last accessed Feb. 24, 2017. https://www.dodocase.com/products/p2-virtual-reality-cardboard-pop-up-viewer.
(Continued)

*Primary Examiner* — Paul M Berardesca
(74) *Attorney, Agent, or Firm* — Gates & Cooper LLP

(57) ABSTRACT

A method, system, and apparatus provide the ability to control a system state of/in an image viewing application using a camera/portable viewing device. A screen of the camera is used to display a virtual reality view and an opening is positioned over a lens of the camera. The screen and physical buttons of the camera are not accessible when the camera is placed into the virtual reality viewing mechanism. An image is acquired from a camera through the opening. Color is used to make choices for operations. Alternatively, based on the toggling of the system state through a light blocking operation, a motion operation is conducted. The motion operation is based on length of time light is blocked and the length controls a speed of the motion operation.

12 Claims, 5 Drawing Sheets

Related U.S. Application Data

(60) Provisional application No. 62/186,213, filed on Jun. 29, 2015.

(56) References Cited

U.S. PATENT DOCUMENTS

| | | |
|---|---|---|
| 2014/0184846 A1 | 7/2014 | Yoon et al. |
| 2014/0267889 A1 | 9/2014 | McGowan et al. |
| 2015/0234192 A1 | 8/2015 | Lyons |

OTHER PUBLICATIONS

Autodesk Cardboard, Autodesk Inc.; Copyright 2015. http://cardboard.autodesk.com.

"Experience Your Architectural Designs in 3D—Render Them Speechless", Autodesk Inc., last accessed Mar. 27, 2015. http://autodesk360rendering.typepad.com/blog/2015/02/experience-your-architectural-designs-in-3d.html.

"To Work with Stereo Panoramas" (HELP—Support for A360 rendering service), Autodesk Inc., last accessed Feb. 24, 2017. http://docs.autodesk.com/ADSK360/help/ENU/rendering/index.html#url=./files/GUID-04ABDDCA-4F5D-4EB7-B360-2A164C221A68.htm.

USING CAMERA IMAGE LIGHT INTENSITY TO CONTROL SYSTEM STATE

CROSS-REFERENCE TO RELATED APPLICATIONS

This application is a divisional application of U.S. patent application Ser. No. 15/192,745, filed on Jun. 24, 2016, with inventor(s) Hans David Kellner, entitled "Using Camera Image Light Intensity to Control System State," which application is hereby incorporated by reference herein, and which application claims the benefit under 35 U.S.C. Section 119(e) of the following and commonly-assigned U.S. provisional patent application(s), which is/are incorporated by reference herein: Provisional Application Ser. No. 62/186,213, filed on Jun. 29, 2015, with inventor(s) Hans David Kellner, entitled "Using Camera Image Light Intensity to Control System State".

BACKGROUND OF THE INVENTION

1. Field of the Invention

The present invention relates generally to virtual reality/augmented reality views, and in particular, to a method, system, apparatus, and article of manufacture for controlling the state of a virtual/augmented reality system using the light detection capabilities of a camera.

2. Description of the Related Art

There is a rising trend to use portable devices (e.g., cellular phones, tablet computer, etc.) as augmented reality (AR) or virtual reality (VR) displays. To use such portable devices in AR/VR, a viewing mechanism (e.g., that contains lenses) is created with a holder in which the portable device is placed/added. The screen of the portable device is viewed through the lenses and the output provides a stereoscopic view of the image(s) displayed on the portable device screen. An example of such a viewing mechanism are VR goggles that are created out of cardboard (e.g., GOOGLE™ CARDBOARD™). With a cardboard viewing mechanism, a user gets/builds a cardboard goggle frame and inserts a phone that projects images and views.

The problem with such prior art viewing mechanisms is that in order to control anything that the user sees or to conduct any interaction, there is no user interface (UI) that is easily accessible. In particular, once the portable device is inserted into the viewing mechanism, the user has limited or no access to the device. Further, accessing the hardware "buttons" from within a browser based scripting application (e.g., JAVASCRIPT™) is not possible. In this regard, some applications (e.g., browser based applications), do not have access to certain hardware on the camera/portable viewing device (e.g., volume buttons) while a native application may have access to such hardware components. For example, the user may have limited or no access to the volume control and/or other buttons and there is no ability to interact with the images displayed. For example, if the user is looking at a model of a house in a three-dimensional (3D) VR stereoscopic camera view, rather than looking at the model statically through the viewing mechanism, it is desirable to orient the camera in a particular manner and move towards/away from the model. However, prior art systems fail to provide a simple mechanism for accessing the hardware of the portable device to query and interact with the software executing on the portable device.

SUMMARY OF THE INVENTION

Embodiments of the invention overcome the problems of the prior art by using a light detection component/image acquiring device (e.g., a back-facing camera) of a portable (viewing) device to control software executing on the device. By (temporarily) blocking the light detection component, the binary state is modified and can be used to perform an action in the executing software. Similarly, by performing a sequence of blocking actions, more advanced operations/interactions can be performed.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1A:
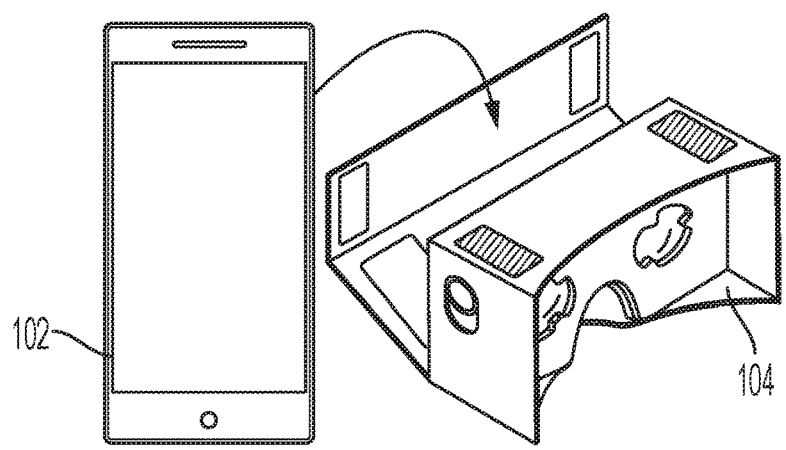
FIGS. 1A-1C illustrate the use of virtual reality (VR) cardboard goggles based on a cellular phone display screen in accordance with one or more embodiments of the invention.
Figure 1B:
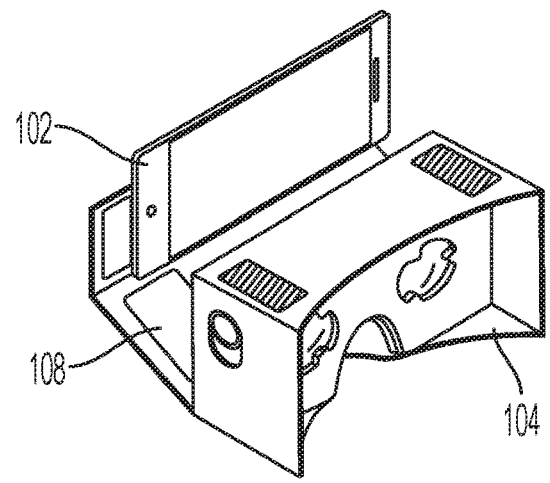
Figure 1C:
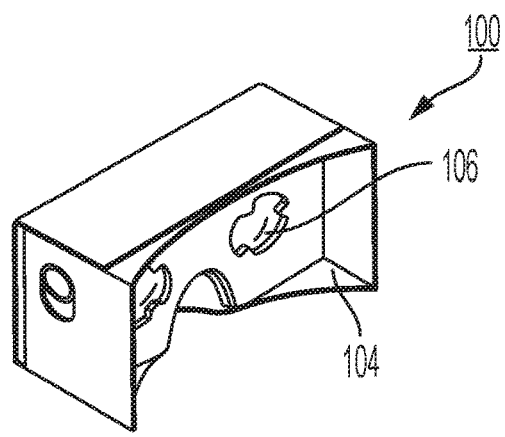

FIGS. 1A-1C illustrate the use of virtual reality (VR) cardboard goggles (also referred to as a virtual reality viewing mechanism) based on a cellular phone/portable viewing device display screen in accordance with one or more embodiments of the invention. A gallery image (e.g., retrieved from a website) and/or model that the user desires to interact with is loaded onto the cellular phone/tablet/portable viewing device 102, and the phone/tablet 102 is slid into a pair of cardboard virtual reality goggles or viewer 104 (see FIGS. 1A and 1B).

As illustrated in FIG. 1C, the cardboard virtual reality goggles/viewer 104 may then be closed such that the display screen of the phone/tablet/portable viewing device 102 is viewable through the lenses 106 of the cardboard virtual reality goggles/viewer 104. The VR viewing device/mechanism 100 can be shifted left, right, up, and down, to navigate around the 3D panorama/model that is displayed on screen phone/tablet 102 and viewed through lenses 106. As illustrated in FIGS. 1A-1C, very few, if any, of the hardware components of the phone/tablet 102 are accessible once placed inside of the goggles 104. Thus, interaction with the image displayed on phone/tablet 102 may be limited.

Figure 2:
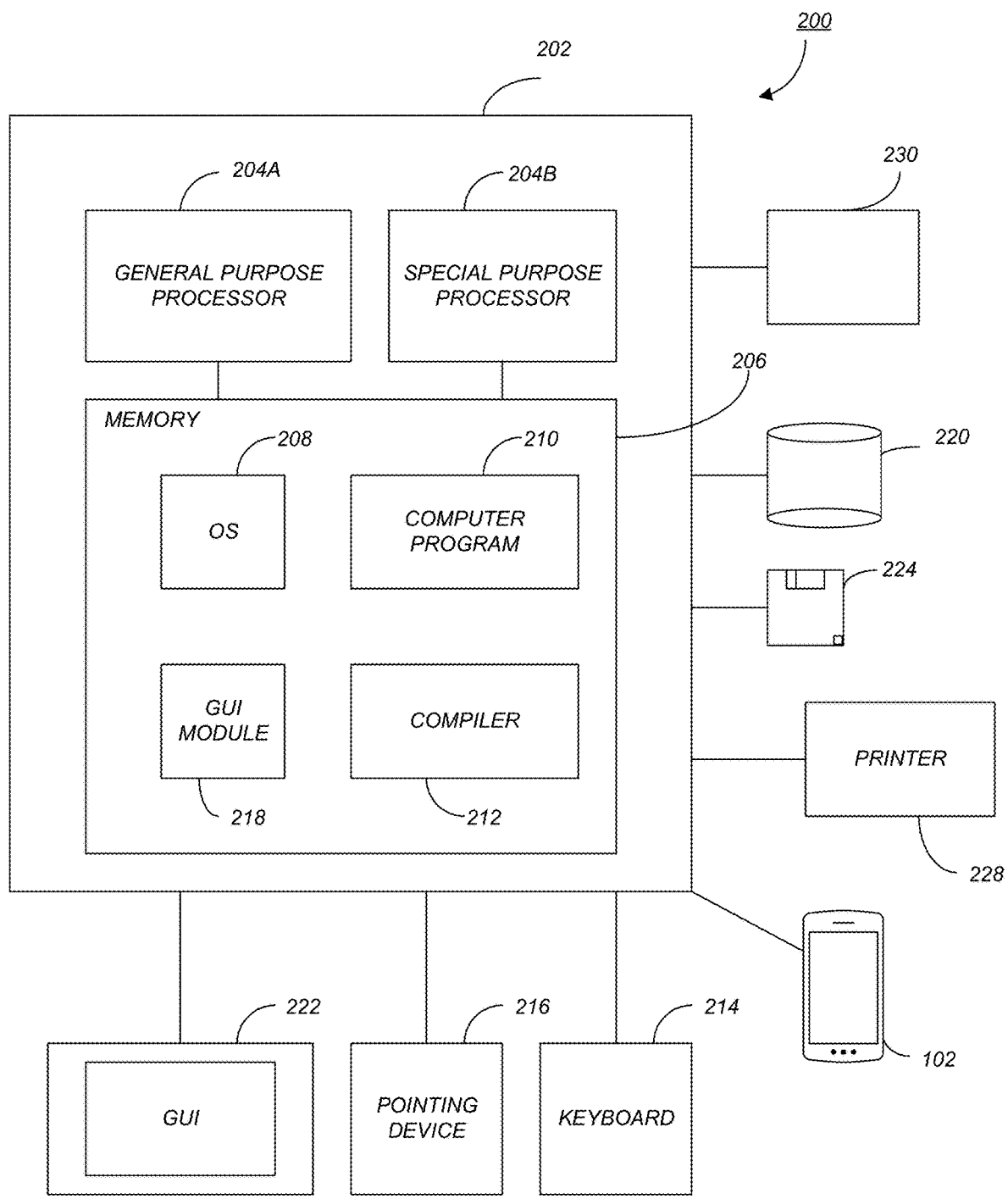
FIG. 2 is an exemplary hardware and software environment used to implement one or more embodiments of the invention.

FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to, and/or integrated with, other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 102 (e.g., an MP3 PLAYER, IPOD™, NOOK™, portable digital video player, cellular device, personal digital assistant, etc.). In yet another embodiment, the computer 202 may comprise a multi-touch device, mobile phone, gaming system, internet enabled television, television set top box, or other internet enabled device executing on various platforms and operating systems.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208, to provide output and results.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise a light emitting diode (LED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218. Although the GUI module 218 is depicted as a separate module, the instructions performing the GUI functions can be resident or distributed in the operating system 208, the computer program 210, or implemented with special purpose memory and processors.

In one or more embodiments, the display 222 is integrated with/into the computer 202 and comprises a multi-touch device having a touch sensing surface (e.g., track pod or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 players, NINTENDO 3DS™, PLAYSTATION PORTABLE™, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program 210 instructions. In one embodiment, the special purpose processor 204B is an application specific integrated circuit (ASIC).

The computer 202 may also implement a compiler 212 that allows an application or computer program 210 written in a programming language such as C, C++, ASSEMBLY, SQL, PYTHON, PROLOG, MATLAB, RUBY, RAILS, HASKELL, or other language to be translated into processor 204 readable code. Alternatively, the compiler 212 may be an interpreter that executes instructions/source code directly, translates source code into an intermediate representation that is executed, or that executes stored precompiled code. Such source code may be written in a variety of programming languages such as JAVA™ JAVASCRIPT™, PERL™ BASIC™, etc. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from, and providing output to, other computers 202.

In one embodiment, instructions implementing the operating system 208, the computer program 210, and the compiler 212 are tangibly embodied in a non-transitory computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program 210 instructions which, when accessed, read and executed by the computer 202, cause the computer 202 to perform the steps necessary to implement and/or use the present invention or to load the program of instructions into a memory 206, thus creating a special purpose data structure causing the computer 202 to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 202.

Figure 3:
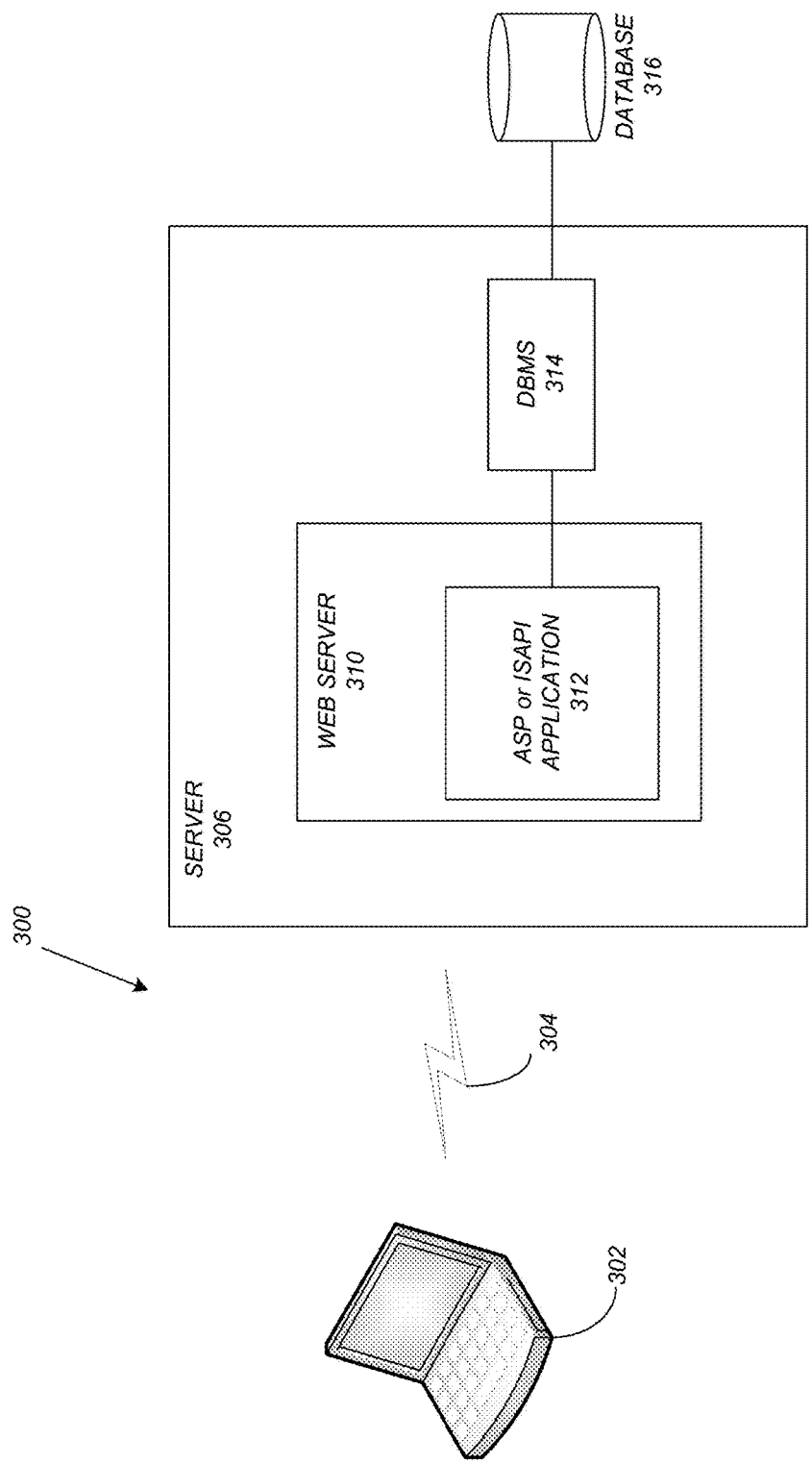
FIG. 3 schematically illustrates a typical distributed computer system using a network to connect client computers to server computers in accordance with one or more embodiments of the invention.

FIG. 3 schematically illustrates a typical distributed computer system 300 using a network 304 to connect client computers 302 to server computers 306. A typical combination of resources may include a network 304 comprising the Internet, LANs (local area networks), WANs (wide area networks), SNA (systems network architecture) networks, or the like, clients 302 that are personal computers or workstations (as set forth in FIG. 2), and servers 306 that are personal computers, workstations, minicomputers, or mainframes (as set forth in FIG. 2). However, it may be noted that different networks such as a cellular network (e.g., GSM [global system for mobile communications] or otherwise), a satellite based network, or any other type of network may be used to connect clients 302 and servers 306 in accordance with embodiments of the invention.

A network 304 such as the Internet connects clients 302 to server computers 306. Network 304 may utilize ethernet, coaxial cable, wireless communications, cellular communications, radio frequency (RF), etc. to connect and provide the communication between clients 302 and servers 306. Clients 302 may execute a client application or web browser and communicate with server computers 306 executing web servers 310. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 302 may be downloaded from server computer 306 to client computers 302 and installed as a plug-in or ACTIVEX™ control of a web browser. Accordingly, clients 302 may utilize ACTIVEX™ components/component object model (COM) or distributed COM (DCOM) components to provide a user interface on a display of client 302. The web server 310 is typically a program such as MICROSOFT'S INTERNET INFORMATION SERVER™.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of, or connected directly to, client 302 instead of communicating/obtaining the information from database 316 across network 304. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT' S™ Transaction Server (MTS) to access required data stored in database 316 via an interface such as ADO (Active Data Objects), OLE DB (Object Linking and Embedding DataBase), or ODBC (Open DataBase Connectivity).

Generally, these components 300-316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 302 and 306 may be interchangeable and may further include thin client devices with limited or full processing capabilities, portable devices such as cell phones, notebook computers, pocket computers, multi-touch devices, and/or any other devices with suitable processing, communication, and input/output capability. Embodiments of the invention are implemented as a software application on a client 302 or server computer 306. Further, as described above, the client 302 or server computer 306 may comprise a thin client device or a portable device that has a multi-touch-based display.

Figure 4:
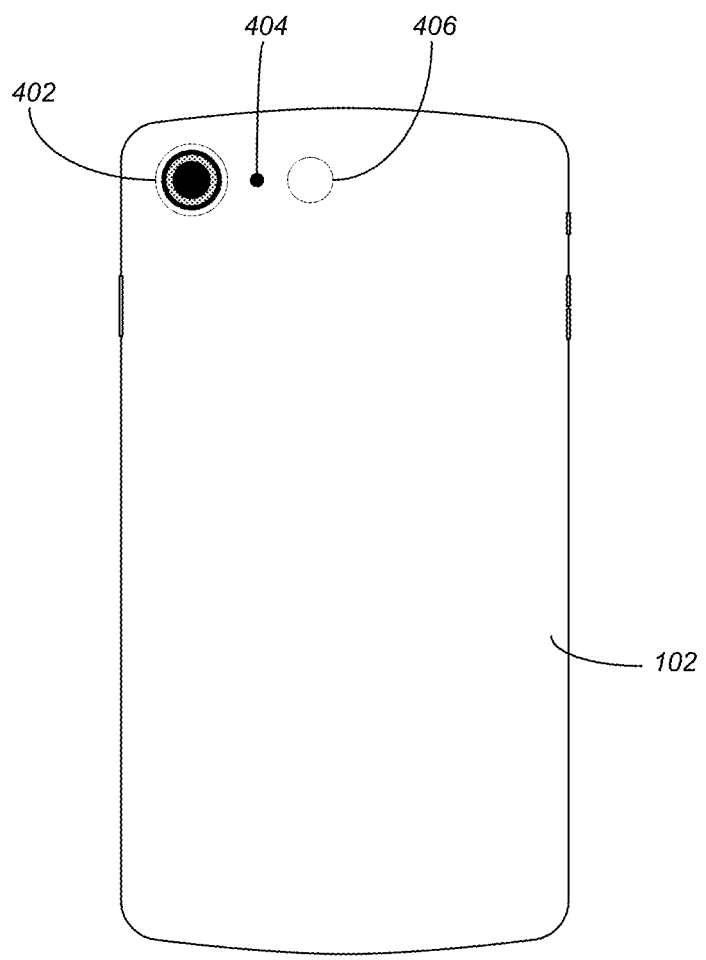
FIG. 4 illustrates the back/rear of a mobile device that may be used in accordance with one or more embodiments of the invention.

FIG. 4 illustrates the back/rear of a mobile phone/cellular phone/portable viewing device 102 that may be used in accordance with one or more embodiments of the invention. Device 102 contains a rear/back facing camera 402 (also referred to as a lens of an image acquiring component). While located in the upper-left corner of the device 102 of FIG. 4, alternative embodiments may locate the rear/back facing camera 402 in different locations (e.g., center of the (mobile) device 102, top-center of the mobile device 102, top-right of the mobile device 102, etc.). Although not required, mobile device 102 may also include a microphone 404 and/or a flash 406.

Of course, those skilled in the art will recognize that any combination of the above components, or any number of different components, peripherals, and other devices, may be used with computers 302 and 306, and/or mobile/tablet device 102.

Control of Image Displayed Via Camera/Portable Viewing Device

Embodiments of the invention overcome the problems of the prior art using the rear/back facing camera/image acquiring component 402 in a variety of ways so that it can control the VR viewer 100 (that includes the camera/tablet 102) and/or the image that is displayed on camera/tablet 102. These methods might be, but are not limited to:

- binary blocking or unblocking the camera/image acquiring component/lens 402 completely;
- gradient blocking where some light might be detected through the camera/image acquiring component/lens 402;
- using color to make choices using colored gloves, finger overlays;
- different shapes; and
- gestures.

As described above, the typical VR cardboard setup uses a mobile/portable viewing device 102 for the screen. However, such a screen is usually not accessible for touching. Nor are the mobile device's physical buttons accessible. Referring again to FIG. 1B, in embodiments of the invention, the cardboard goggles 104 may have a hole/opening 108 in the cardboard, or other access capability to the rear facing camera (e.g., a transparent/translucent covering over the area of phone 102 where the camera 402 is located). The objective of such access may merely be to allow the user to cover and/or block all (or a portion) of light from entering the camera 402 (i.e., the camera lens). Such covering/blocking may be performed with a user's hand/fingers, an additional piece of cardboard that slides/folds over the camera 402, a piece of cloth, etc. Accordingly, access to the physical buttons on the phone/tablet 102 are not required and only the ability to block/partially block light from the camera 402 is necessary.

In view of the above, embodiments of the invention use the back facing camera 402 to check for "darkness". When a user blocks the camera 402, the overall brightness of the video being captured drops. Embodiments further sense for a threshold of darkness and if the threshold has been met, an action is toggled. In this regard, since it may be impossible to completely block all light, once the level of light decreases below a defined threshold, the system determines that the trigger/light blocking operation has been initiated.

By providing access to the camera/image acquiring component 402, the user is able to provide input into the system/application executing in phone/tablet device 102. Simple cases allow the user to merely block the view of the camera 402 to toggle a binary state (on/off). In this regard, embodiments of the invention can provide the ability to toggle movement on/off (and adjust speed) from within a browser application. Repeated blocking can toggle the binary state on/off. For example, the user may utilize VR goggles 100 and as the user moves his/her head, different menu options may be highlighted. To select/activate a particular option, the user can simply block the light entering camera 402 briefly.

In addition, gradient values may also be utilized where the user blocks the light in various levels. However, gradient values may not be consistent because of lighting conditions, auto-exposure of the camera 402, etc. In yet another embodiment, a series/sequence of light blocking operations may serve to trigger a variety of different operations. Such a sequence may be viewed similar to Morse code, where the user can block the light for short and long periods of time in a defined manner, wherein different sequences correspond to the execution of different operations (e.g., one operation for zooming in, another operation to begin recording video, another operation to enable the flash 406, etc.).

In an additional embodiment, speed control may be provided by waiting a moment after the "on" state is toggled (i.e., determining if the camera 402 has been blocked for a predefined threshold amount of time). Thereafter, the longer the camera 402 is blocked, the faster the speed increases. In other words, the user can toggle the start or stop of motion in the VR viewer device 100. The length of time the image is "dark" may be used to vary the speed of the movement. Thus, a first toggle operation may cause the software to move forward/zoom into a scene, and a second toggle may stop the forward motion. Accordingly, a user blocks the camera to toggle movement, and then releases to begin moving at a default speed. Alternatively, the user blocks the camera 402 and continues to block it until the movement speed reaches a desired level. To stop moving, the user can simply block the camera 402 when moving.

In addition to the above, embodiments of the invention are not limited to cardboard VR goggles but may be implemented in any device with a light sensitive detector/camera, for controlling any type of application. In other words, any device that has a camera or a sensor that enables the level of light to be detected may be used. For example, any type of cellular device that has a camera, a tablet computer with a camera, a webcam, a digital camera, a microscope, etc. may be used to perform a variety of operations in a multitude of applications executing on processors/devices that are connected to/communicatively coupled to the light sensitive device. All of such devices enable the operation of the device without actually touching the hardware (i.e., merely blocking the light that enters the light sensitive detector).

In yet another embodiment, gestures may be recognized via the back facing camera. For example, an application may check for fingers visible in the view. One could hold a straightened finger in front of the camera. The finger could serve as a virtual dial control. Turning the finger (pointing) would act as if dialing up/down a parameter. Quickly removing the finger would stop the recognition and then leave the parameter where it was set. Returning the finger would enable the virtual dial again. As the finger will probably come in at a different angle than when it was removed, the newly recognized angle will be considered the current parameter's value. Then adjustments are relative from there.

Light Detection Threshold Determination

Figure 5:
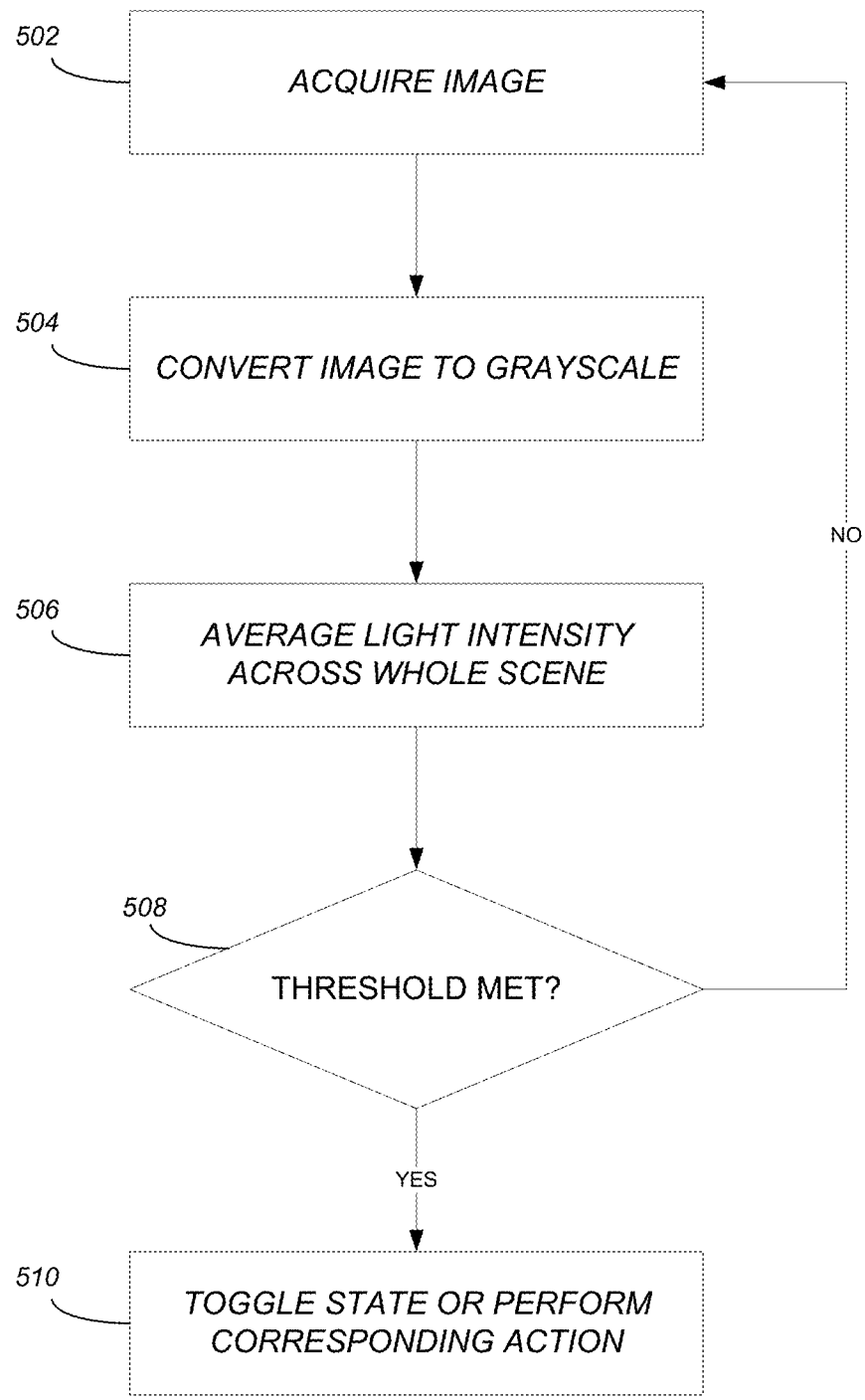
FIG. 5 illustrates the logical flow for evaluating determining whether the user has blocked the camera/light in accordance with one or more embodiments of the invention.

As described herein, an application executing in the camera/tablet device 102 may decipher the light detection information received via the camera 402. As further described above, embodiments of the invention may compute/determine whether a threshold level of light has been detected in order to activate the trigger indicating that the user is blocking the light. FIG. 5 illustrates the logical flow for evaluating/determining whether the user has blocked the camera/light in accordance with one or more embodiments of the invention. In other words, FIG. 5 illustrates the logical flow for controlling a system state of/in an image viewing application.

The steps of FIG. 5 may be performed/repeated at regularly defined intervals (e.g., time and/or processor cycle based intervals).

At step 502, an image is acquired from the camera. This step may also include placing the camera/portable viewing device into a virtual reality viewing mechanism (e.g., a VR viewer as described above) where an opening of the mechanism is positioned over a lens of the camera/portable viewing device, and a screen and physical buttons of the camera/portable viewing device are not accessible for touching (i.e., once placed into the viewing mechanism). In addition, some applications (e.g., browser based applications), do not have access to certain hardware on the camera/portable viewing device (e.g., volume buttons) while a native application may have access to such hardware components.

At step 504, the image is converted to gray scale values.

At step 506, all of the gray scale values are averaged. In this regard, the average light intensity across the whole scene/image may be determined by averaging the individual values of all of the pixels in the scene/image. Alternatively, rather than averaging all of the pixels, regularly spaced pixels (e.g., every other pixel, every 4 pixels, every 16 pixels, etc.) may be averaged to reduce the processing time.

At step 508, a determination is made regarding whether the average value has met the threshold for whether the light has been blocked. In other words, if the average value is below a basic level of light (i.e., a threshold value), then it can be determined that the user is blocking the light. As an alternative to comparing the average to a defined threshold level, the determination may be based on a comparison from the average level of a prior image. Such a comparison between average levels of different images (consecutive images or a base level image) may evaluate/determine whether the change (of the averages between two images) exceeds a change threshold.

If the threshold has been met, the state is toggled or a (corresponding) action (e.g., based on the toggling) is performed at step 510. Alternatively, if the threshold has not been met, the process returns to step 502 to acquire another image (i.e., at a defined time/processor cycle interval). As described above, a determination may also be made regarding whether the incoming light to the camera has been blocked in a sequence, and performing (at step 510) an action based on the sequence (wherein different sequences correspond to performing different actions).

CONCLUSION

This concludes the description of the preferred embodiment of the invention. The following describes some alternative embodiments for accomplishing the present invention. For example, any type of computer, such as a mainframe, minicomputer, touchscreen, cellular device, or personal computer, or computer configuration, such as a timesharing mainframe, local area network, cellular network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for controlling a system state in an image viewing application, comprising:
   placing the camera into a virtual reality viewing mechanism, wherein:
      a screen of the camera is used to display a virtual reality view;
      an opening of the virtual reality viewing mechanism is positioned over a lens of the camera; and
      the screen and physical buttons of the camera are not accessible when the camera is placed into the virtual reality viewing mechanism;
   acquiring an image from a camera through the opening of the virtual reality viewing mechanism;
   determining that a user has initiated a light blocking operation and toggling the system state of the image viewing application; and
   based on the toggling of the system state, conducting a motion operation within the image viewing application, wherein the motion operation is based on length of time light is blocked from the opening of the virtual reality viewing mechanism, and wherein the length of time controls a speed of the motion operation.

2. The computer-implemented method of claim 1, wherein the motion operation comprises a forward movement into a virtual reality scene.

3. The computer-implemented method of claim 1, wherein the motion operation comprises a zoom into a virtual reality scene.

4. The computer-implemented method of claim 1, wherein the speed increases as the length of time increases.

5. The computer-implemented method of claim 1, wherein:
   a second toggling of the system state stops the motion operation; and
   the second toggling is based on a second light blocking operation.

6. The computer-implemented method of claim 1, wherein operation of the camera is controlled without actually touching hardware of the camera.

7. An apparatus for controlling a system state in an image viewing application using a portable viewing device comprising:
   (a) a portable viewing device comprising an image acquiring component and a processor that executes software; and
   (b) a virtual reality viewing mechanism into which the portable viewing device is inserted, wherein:
      (i) a screen of the portable viewing device is used to display a virtual reality view;
      (ii) an opening of the virtual reality viewing mechanism is positioned over a lens of the image acquiring component; and
      (iii) the screen and physical buttons of the portable viewing device are not accessible when the portable viewing device is inserted into the virtual reality viewing mechanism;
   (c) the software:
      (i) acquiring an image from a camera through the opening of the virtual reality viewing mechanism;
      (ii) determining that a user has initiated a light blocking operation and toggling the system state of the image viewing application; and
      (iii) based on the toggling of the system state, conducting a motion operation within the image viewing application, wherein the motion operation is based on length of time light is blocked from the opening of the virtual reality viewing mechanism, and wherein the length of time controls a speed of the motion operation.

8. The apparatus of claim 7, wherein the motion operation comprises a forward movement into a virtual reality scene.

9. The apparatus of claim 7, wherein the motion operation comprises a zoom into a virtual reality scene.

10. The apparatus of claim 7, wherein the speed increases as the length of time increases.

11. The apparatus of claim 7, wherein:
   a second toggling of the system state stops the motion operation; and
   the second toggling is based on a second light blocking operation.

12. The apparatus of claim 7, wherein operation of the portable viewing device is controlled without actually touching hardware of the portable viewing device.

* * * * *